US009365700B2

(12) United States Patent
Hergenrother et al.

(10) Patent No.: US 9,365,700 B2
(45) Date of Patent: Jun. 14, 2016

(54) AMINO ALKOXY-MODIFIED SILSESQUIOXANE ADHESIVES FOR IMPROVED METAL ADHESION AND METAL ADHESION RETENTION TO CURED RUBBER

(71) Applicant: Bridgestone Corporation, Tokyo (JP)

(72) Inventors: William L. Hergenrother, Akron, OH (US); Walter Tomaszewski, Canton, OH (US); Ashley Hilton, Massillon, OH (US); Michael Hayes, Canton, OH (US); James H. Pawlow, Akron, OH (US); Terrence E. Hogan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/450,799

(22) Filed: Aug. 4, 2014

(65) Prior Publication Data
US 2015/0152249 A1 Jun. 4, 2015

Related U.S. Application Data

(63) Continuation of application No. 12/347,086, filed on Dec. 31, 2008, now Pat. No. 8,794,282.

(60) Provisional application No. 61/018,213, filed on Dec. 31, 2007, provisional application No. 61/017,932, filed on Dec. 31, 2007, provisional application No. 61/086,236, filed on Aug. 5, 2008.

(51) Int. Cl.
| | |
|---|---|
| *C08G 77/28* | (2006.01) |
| *C08L 21/00* | (2006.01) |
| *B60C 1/00* | (2006.01) |
| *C08K 7/06* | (2006.01) |
| *C08G 77/26* | (2006.01) |
| *C09D 183/08* | (2006.01) |
| *B29D 30/38* | (2006.01) |
| *C09J 183/08* | (2006.01) |
| *D07B 1/06* | (2006.01) |
| *B29D 30/48* | (2006.01) |
| *B29C 65/00* | (2006.01) |

(52) U.S. Cl.
CPC . *C08K 7/06* (2013.01); *B29D 30/38* (2013.01); *B60C 1/00* (2013.01); *C08G 77/26* (2013.01); *C08G 77/28* (2013.01); *C08L 21/00* (2013.01); *C09D 183/08* (2013.01); *C09J 183/08* (2013.01); *D07B 1/0666* (2013.01); *B29C 66/71* (2013.01); *B29C 66/74283* (2013.01); *B29D 2030/383* (2013.01); *B29D 2030/483* (2013.01); *B60C 2009/0014* (2013.04); *B60C 2009/0021* (2013.04); *Y10T 428/31663* (2015.04)

(58) Field of Classification Search
CPC ............ C08G 77/28; C08L 21/00; B60C 1/00
USPC ................. 427/207, 207.1; 524/571
See application file for complete search history.

(56) References Cited

U.S. PATENT DOCUMENTS

| | | | |
|---|---|---|---|
| 2,462,640 A | 2/1949 | Franklin et al. | |
| 3,186,965 A | 6/1965 | Plueddemann et al. | |
| 3,304,318 A | 2/1967 | Brady et al. | |
| 3,428,706 A | 2/1969 | Jasinski et al. | |
| 3,647,740 A | 3/1972 | Loree et al. | |
| 3,734,763 A | 5/1973 | Plueddemann | |
| 3,816,493 A | 6/1974 | Nitzsche et al. | |
| 4,052,524 A | 10/1977 | Harakas et al. | |
| 4,101,460 A | 7/1978 | Small et al. | |
| 4,258,770 A | 3/1981 | Davis et al. | |
| 4,269,741 A | 5/1981 | Homan | |
| 4,340,515 A | 7/1982 | Frassek et al. | |
| 4,391,855 A | 7/1983 | Geeck | |
| 4,424,297 A | 1/1984 | Bey | |
| 4,441,946 A | 4/1984 | Sharma | |
| 4,512,897 A | 4/1985 | Crowder, III et al. | |
| 4,521,558 A * | 6/1985 | Mowdood ..................... | 524/145 |
| 4,694,040 A | 9/1987 | Hashimoto et al. | |
| 4,745,145 A | 5/1988 | Schonfeld et al. | |
| 4,822,681 A | 4/1989 | Schossler et al. | |
| 4,847,162 A | 7/1989 | Haluska et al. | |
| 4,889,747 A | 12/1989 | Wilson | |
| 5,015,717 A | 5/1991 | Martin et al. | |
| 5,162,409 A | 11/1992 | Mroczkowski | |

(Continued)

FOREIGN PATENT DOCUMENTS

| | | |
|---|---|---|
| CN | 101180344 | 5/2008 |
| EP | 0025840 | 7/1980 |

(Continued)

OTHER PUBLICATIONS

Hergenrother, William L. et al., "Reduction of Volatile Organic Compound Emission. 1. Synthesis and Characterization of Alkoxy-Modified Silsesquioxane", Journal of Applied Polymer Science, vol. 115, pp. 79-90 (2010).

(Continued)

*Primary Examiner* — Kelechi Egwim
(74) *Attorney, Agent, or Firm* — Meredith E. Hooker; Nathan T. Lewis

(57) ABSTRACT

Amino alkoxy-modified silsesquioxanes (amino AMS), and/or amino co-AMS compounds that also comprise a mercaptosilane or a blocked mercaptosilane, are excellent adhesives for coating plated or unplated metal wire for adherence of the wire to a rubber stock. The amino AMS and/or the amino/mercaptan co-AMS adhesives can be used with all types of rubber and there is no requirement for the use of special adhesive additives to the rubber vulcanizates, such as, but not limited to, cobalt, resins and high sulfur levels. In particular, the use of amino AMS and/or amino/mercaptan co-AMS compounds as adhesives for bonding wire to rubber also improves the adherence performance of the reinforcements to obtain sufficient bonding that is resistant to degradation over the course of time, especially resistance to thermal aging and/or thermo-oxidizing aging, in particular corrosion in the presence of water.

20 Claims, No Drawings

(56) References Cited

U.S. PATENT DOCUMENTS

| | | |
|---|---|---|
| 5,359,022 A | 10/1994 | Mautner et al. |
| 5,363,994 A | 11/1994 | Angeline |
| 5,447,971 A | 9/1995 | Bergh et al. |
| 5,484,867 A | 1/1996 | Lichtenhan et al. |
| 5,534,592 A | 7/1996 | Halasa et al. |
| 5,552,476 A | 9/1996 | Halling |
| 5,650,474 A | 7/1997 | Yamaya et al. |
| 5,684,113 A | 11/1997 | Nakanishi et al. |
| 5,750,197 A | 5/1998 | van Ooij et al. |
| 5,750,610 A | 5/1998 | Burns et al. |
| 5,763,388 A | 6/1998 | Lightsey et al. |
| 5,830,934 A | 11/1998 | Krishnan |
| 5,844,060 A | 12/1998 | Furuya et al. |
| 5,854,369 A | 12/1998 | Geck et al. |
| 5,907,015 A | 5/1999 | Sexsmith |
| 5,914,364 A | 6/1999 | Cohen et al. |
| 5,916,973 A | 6/1999 | Zimmer et al. |
| 5,929,149 A | 7/1999 | Matsuo et al. |
| 5,932,757 A | 8/1999 | Standke et al. |
| 5,958,161 A | 9/1999 | Grimberg et al. |
| 5,969,057 A | 10/1999 | Schoeley et al. |
| 5,985,371 A | 11/1999 | Fujioka et al. |
| 5,985,953 A | 11/1999 | Lightsey et al. |
| 6,015,850 A | 1/2000 | Nakamura et al. |
| 6,033,597 A | 3/2000 | Yatsuyanagi et al. |
| 6,048,910 A | 4/2000 | Furuya et al. |
| 6,087,519 A | 7/2000 | Garnier et al. |
| 6,124,491 A | 9/2000 | Wolter et al. |
| 6,127,468 A | 10/2000 | Cruse et al. |
| 6,140,447 A | 10/2000 | Gay et al. |
| 6,162,547 A | 12/2000 | van Ooji et al. |
| 6,191,247 B1 | 2/2001 | Ishikawa et al. |
| 6,204,339 B1 | 3/2001 | Waldman et al. |
| 6,232,424 B1 | 5/2001 | Zhong et al. |
| 6,239,243 B1 | 5/2001 | Deng et al. |
| 6,271,331 B1 | 8/2001 | Gay et al. |
| 6,294,007 B1 | 9/2001 | Martin |
| 6,313,205 B1 | 11/2001 | Chiron et al. |
| 6,326,424 B1 | 12/2001 | Louis et al. |
| 6,331,605 B1 | 12/2001 | Lunginsland et al. |
| 6,361,871 B1 | 3/2002 | Jenkner et al. |
| 6,372,843 B1 | 4/2002 | Barruel et al. |
| 6,399,210 B1 | 6/2002 | Zhong |
| 6,414,061 B1 | 7/2002 | Cruse et al. |
| 6,426,378 B1 | 7/2002 | Lickes et al. |
| 6,429,245 B1 | 8/2002 | Francik et al. |
| 6,433,065 B1 | 8/2002 | Lin et al. |
| 6,433,077 B1 | 8/2002 | Craig et al. |
| 6,455,158 B1 | 9/2002 | Mei et al. |
| 6,465,670 B2 | 10/2002 | Thise et al. |
| 6,465,671 B1 | 10/2002 | Bae et al. |
| 6,528,673 B2 | 3/2003 | Cruse et al. |
| 6,548,573 B1 | 4/2003 | Rempert |
| 6,548,594 B2 | 4/2003 | Luginsland et al. |
| 6,573,356 B2 | 6/2003 | Araki et al. |
| 6,608,125 B2 | 8/2003 | Cruse et al. |
| 6,611,518 B1 | 8/2003 | Ngo et al. |
| 6,624,214 B2 | 9/2003 | Zimmer et al. |
| 6,624,237 B2 | 9/2003 | Biteau et al. |
| 6,635,700 B2 | 10/2003 | Cruse et al. |
| 6,649,684 B1 | 11/2003 | Okel |
| 6,653,365 B2 | 11/2003 | Jia |
| 6,660,823 B1 | 12/2003 | Lichtenhan et al. |
| 6,683,135 B2 | 1/2004 | Cruse et al. |
| 6,689,834 B2 | 2/2004 | Ackermann et al. |
| 6,696,155 B1 | 2/2004 | Takano et al. |
| 6,727,339 B2 | 4/2004 | Luginsland et al. |
| 6,767,930 B2 | 7/2004 | Svejda et al. |
| 6,770,724 B1 | 8/2004 | Lichtenhan et al. |
| 6,774,202 B2 | 8/2004 | Lee |
| 6,774,569 B2 | 8/2004 | de Vries et al. |
| 6,811,684 B2 | 11/2004 | Mohr et al. |
| 6,821,632 B2 | 11/2004 | Topp et al. |
| 6,830,826 B2 | 12/2004 | Brabant et al. |
| 6,841,197 B2 | 1/2005 | Standke et al. |
| 6,852,794 B2 | 2/2005 | Puhala et al. |
| 6,878,768 B2 | 4/2005 | Tardivat et al. |
| 6,890,981 B1 | 5/2005 | Luginsland |
| 6,903,150 B2 | 6/2005 | Zimmer et al. |
| 6,911,518 B2 | 6/2005 | Lichtenhan et al. |
| 6,919,469 B2 | 7/2005 | van Ooij et al. |
| 6,927,270 B2 | 8/2005 | Lichtenhan et al. |
| 6,936,663 B1 | 8/2005 | Modisette |
| 6,972,312 B1 | 12/2005 | Lichtenhan et al. |
| 7,119,150 B2 | 10/2006 | Lin et al. |
| 7,201,944 B2 | 4/2007 | Hergenrother et al. |
| 7,294,669 B2 | 11/2007 | Ito |
| 7,393,564 B2 | 7/2008 | Hergenrother et al. |
| 7,432,321 B2 | 10/2008 | Joshi et al. |
| 7,550,547 B2 | 6/2009 | Wakabayashi et al. |
| 7,732,016 B2 | 6/2010 | van Ooij et al. |
| 7,799,780 B2 | 9/2010 | Herold et al. |
| 7,799,870 B2 | 9/2010 | Hergenrother et al. |
| 7,915,368 B2 | 3/2011 | Hergenrother et al. |
| 8,029,906 B2 | 10/2011 | van Ooij et al. |
| 8,097,674 B2 | 1/2012 | Hergenrother et al. |
| 8,288,474 B2 | 10/2012 | Hergenrother et al. |
| 8,513,371 B2 | 8/2013 | Hergenrother et al. |
| 8,642,691 B2 | 2/2014 | Hergenrother et al. |
| 8,794,282 B2 | 8/2014 | Hergenrother et al. |
| 8,809,481 B2 | 8/2014 | Hergenrother et al. |
| 8,822,620 B2 | 9/2014 | Hergenrother et al. |
| 2001/0011046 A1* | 8/2001 | Ichikawa et al. ............ 473/371 |
| 2002/0055011 A1 | 5/2002 | Brabant et al. |
| 2002/0055564 A1 | 5/2002 | Cruse et al. |
| 2002/0061409 A1* | 5/2002 | Topp et al. ............ 428/461 |
| 2002/0151616 A1 | 10/2002 | Ozai et al. |
| 2003/0055193 A1 | 3/2003 | Lichtenhan et al. |
| 2003/0059393 A1 | 3/2003 | Wrolson et al. |
| 2003/0088034 A1 | 5/2003 | Luginsland et al. |
| 2003/0114601 A1 | 6/2003 | Cruse et al. |
| 2003/0130388 A1 | 7/2003 | Luginsland et al. |
| 2003/0199619 A1 | 10/2003 | Cruse |
| 2004/0042880 A1 | 3/2004 | Lee |
| 2004/0042980 A1 | 3/2004 | Kanji et al. |
| 2004/0122180 A1 | 6/2004 | Hergenrother et al. |
| 2004/0210001 A1 | 10/2004 | Cruse et al. |
| 2004/0266968 A1 | 12/2004 | Korth et al. |
| 2005/0009982 A1 | 1/2005 | Inagaki et al. |
| 2005/0010012 A1 | 1/2005 | Jost et al. |
| 2005/0079364 A1 | 4/2005 | van Ooij et al. |
| 2005/0244659 A1 | 11/2005 | Higuchi et al. |
| 2005/0277717 A1 | 12/2005 | Joshi et al. |
| 2006/0083925 A1 | 4/2006 | Laine et al. |
| 2006/0086450 A1 | 4/2006 | E. Hogan et al. |
| 2006/0089446 A1 | 4/2006 | Lin et al. |
| 2006/0089504 A1 | 4/2006 | Ito et al. |
| 2006/0115657 A1 | 6/2006 | Griswold |
| 2006/0147731 A1 | 7/2006 | Grimberg et al. |
| 2006/0210813 A1 | 9/2006 | Fath et al. |
| 2006/0217473 A1 | 9/2006 | Hergenrother et al. |
| 2007/0059448 A1 | 3/2007 | Smith et al. |
| 2007/0275255 A1 | 11/2007 | Ooms et al. |
| 2008/0293858 A1 | 11/2008 | Hergenrother et al. |
| 2009/0005481 A1 | 1/2009 | Ishida et al. |
| 2009/0165913 A1 | 7/2009 | Hergenrother et al. |
| 2009/0171014 A1 | 7/2009 | Hergenrother et al. |
| 2009/0181248 A1 | 7/2009 | van Ooij et al. |
| 2009/0203929 A1 | 8/2009 | Hergenrother et al. |
| 2009/0326255 A1 | 12/2009 | Hergenrother et al. |
| 2010/0071818 A1 | 3/2010 | Hergenrother et al. |
| 2015/0037582 A1 | 2/2015 | Jones et al. |
| 2015/0225506 A1 | 8/2015 | Hergenrother et al. |

FOREIGN PATENT DOCUMENTS

| | | |
|---|---|---|
| EP | 1995267 | 11/2008 |
| JP | 6306173 | 11/1994 |
| JP | 7292108 | 11/1995 |
| JP | H8155287 | 6/1996 |
| JP | 10001549 | 1/1998 |
| JP | 10059984 | 3/1998 |
| JP | 10292048 A | 11/1998 |
| JP | H10292048 | 11/1998 |

(56) References Cited

FOREIGN PATENT DOCUMENTS

| | | | |
|---|---|---|---|
| JP | 11343366 | | 12/1999 |
| JP | 2001205187 | | 7/2001 |
| JP | 2002138164 | | 5/2002 |
| JP | 2002138164 | A * | 5/2002 |
| JP | 2004521992 | | 7/2004 |
| JP | 2005029771 | | 2/2005 |
| JP | 2006137821 | | 6/2006 |
| JP | 2006285017 | | 10/2006 |
| JP | 2007008987 | | 1/2007 |
| JP | 2007268432 | | 10/2007 |
| KR | 20020078721 | | 10/2002 |
| WO | 0224826 | | 3/2002 |
| WO | 03091314 | | 11/2003 |
| WO | 2005093002 | | 10/2005 |
| WO | 2006031434 | | 3/2006 |
| WO | 2006102518 | | 9/2006 |
| WO | 2008025846 | | 3/2008 |
| WO | 2009085181 | | 7/2009 |

OTHER PUBLICATIONS

"The Essentials of Heterocyclic Chemistry," (a compilation of property data for various classes of heterocyclic compounds) available at http://www.scripps.edu/baran/heterocycles/Essentials1-2009.pdf (no date).
Baney, Ronald H. et al., "Silsesquioxanes," Chem Rev. vol. 95, pp. 1409-1430 (1995).
Boiling Point Calculator from the web site http://partyman.se/boiling-point-calculator, downloaded Nov. 10, 2009 (2 pp.).
Boiling Point Calculator from the web site http://trimen.pl/witek/calculators/wrzenie.html, downloaded Nov. 10, 2009 (2pp.).
Brown, Jr., John F. et al., "The Polycondensation of Phyenlsilanetriol", Journal of the American Chemical Society, vol. 87, No. 19, pp. 4317-4324 (Oct. 5, 1965).
Database WPI Week 200026, Thomson Scientific, London, GB; AN 2000-298587, XP-002573380 & JP2000-0867666, Mar. 28, 2000 (2 pp.).
Dittmar, Uwe et al., "Funktionalisierte Octa-(propylsilsesquioxane)$(3-XC_3H_6)_8(Si_8O_{12})$ Modellverbindungen fur oberflachenmodifizierte Kieselgele", Journal or Organometallic Chemistry, 489 pp. 185-194, (1995) [with English translation].
Dow Chemical USA, "DOWEX Ion Exchange Resins—Fundamentals of Ion Exchange," Retrieved on: Jun. 2000, Retrieved from: http://www.dow.com/PublishedLiterature/dh_0032/0901b803800326ca.pdf?filepath=liquidseps/pdfs/noreg/177-01837.pdf&fromPage=GetDoc, (10 pp.).
Dzhafarov, A.A. et al., "Synthesis and Properties of Organosilicon, Organogermanium, and Organotin Compounds [2-(Arylthio) Ethyl]-Silanes, -Germanes, and -Stannanes," Kalinin State University, Institute of Oil-Additive Chemistry, Academy of Sciences of the Azerbaidzhan SSR. Translated from Zhurnal Obschchei Khimii, vol. 45, No. 9, pp. 2023-2025 (Sep. 1975).
Grubb, W.T., "A Rate Study of the Silanol Condensation Reaction at 25 degrees in Alcoholic Solvents," J. Am. Chem. Soc., 76, pp. 3408-3414 (1954).
Joshi, Mangala et al., "Polymeric Nanocomposites—Polyhedral Oligomeric Silsesquioxanes (POSS) as Hybrid Nanofiller", Journal of Macromolecular Science, Part C—Polymer Reviews, vol. 44, No. 4, pp. 389-410 (2004).
Journal of Applied Polymer Science, Reduction of Volatile Organic Compound Emisson. I. Synthesis and Characterization of Alkoxy-Modified Silesquioxane vol. 115, 79-90 (2010) 2009 Wiley Periodicals, Inc.
Li, Guizhi et al., "Polyhedral Oligomeric Silsesquioxane (POSS) Polymers and Copolymers: A Review," Journal of Inorganic and Organometallic Polymers, vol. 11, No. 3, pp. 123-154 (2002).
Machine Translation of JP 2002-138164, May 14, 2002.
Machine Translation of JP 10-001549 (no date), Jan. 6, 1998.
Product Brochure, Gelest, Inc., "PolySilsesquioxanes and T-Resins $RSiO_{1.5}$", pp. 39-42 (2004).
Rikowski, Eckhard et al., "Cage-Rearrangement of Silsesquioxanes", Polyhedron, vol. 16, No. 19, pp. 3357-3361 (1997).
van Ooij, W.J., "Mechanism and Theories of Rubber Adhesion to Steel Tire Cords", Rubber Chemistry and Technology, vol. 57, No. 3, pp. 421-456 (1984).
Yu, Libing et al., "Preparation, Characterization, and Synthetic Uses of Lanthanide (III) Catalysts Suppported on Ion Exchange Resins", J. Org. Chem., vol. 62, No. 11, pp. 3575-3581 (1997).

* cited by examiner

AMINO ALKOXY-MODIFIED SILSESQUIOXANE ADHESIVES FOR IMPROVED METAL ADHESION AND METAL ADHESION RETENTION TO CURED RUBBER

CROSS-REFERENCE TO RELATED APPLICATIONS

This application is a continuation of U.S. Pat. No. 12/347,086, filed Dec. 31, 2008, which, in turn claims priority to provisional applications 61/018,213 and 61/017,932 filed Dec. 31,2007, and 61/086,236 filed Aug. 5, 2008, the entire disclosures of each of the above are incorporated herein by reference.

BACKGROUND OF THE INVENTION

The present invention is directed toward improving the adhesion and adhesion retention between a rubber composition and metallic reinforcement cord, such as steel wire and cable which is embedded in the rubber stock. Flat sheets or strips of such stocks, reinforced with metal or fibers, are utilized as plies or other components in the manufacture of tires, repair stocks for retreading tires, conveyor belts, hoses and the like and are referred to in the art as rubber skim stocks. Skim refers to a relatively thin layer or coating of the rubber over the reinforcement filaments or cords. Greater thicknesses of rubber can also be bonded to metal in other instances such as motor mounts and golf club shafts.

In the manufacture of the foregoing rubber articles, particularly steel-belted bias and radial tires, it has become common to reinforce the rubber skim stock material with steel wire or cable. One of the more important uses for a metallic reinforced rubber is as a belt where one or more of these belts are substantially circumferentially oriented beneath the tread stock to maintain the integrity and shape of the tire during inflation and subsequent load. Other areas where metal reinforced rubber skim stock may be utilized is in the body ply, bead or chafer of a tire.

There are known methods for promoting adhesion between vulcanizable rubber and steel reinforcement cords. A variety of metallic salts or complexes or other additives have been employed as coatings to the metal or as an ingredient in a rubber composition. For example, steel reinforcement cords are commonly plated with metals, such as brass, zinc or bronze, that are designed to promote and maintain adhesion to sulfur-vulcanized rubber. It is also common to incorporate adhesion promoters into the rubber compounds themselves. For example, such adhesion promoters can include cobalt salt additives, HRH systems (hexamethylene tetramine, resorcinol and hydrated silica), silanes, and the like. In particular, the adhesion of wire to rubber skim stock has been accomplished for years in the tire industry by the use of brass plated steel wire, and a specially formulated rubber containing high sulfur, resin and cobalt salt. However, incorporation of adhesion promoters into the rubber or as a coating for wire, can modify the working properties and performance of the vulcanized compositions, in particular the resistance to thermal and thermo-oxidizing aging. Furthermore, the incorporating of these compounds in the compositions is costly and the metals of these compounds may at times be scarce. In these systems, the adherence performance of the reinforcements obtained are at times insufficient and the bonding obtained can exhibit degradation over the course of time, poor resistance to thermal aging and/or thermo-oxidizing aging, in particular corrosion in the presence of water.

In a continuing effort to improve both the initial and, most importantly, the aged adhesion, alkoxy organosiloxane chemistry has been shown to be promising. Recently, we have discovered that incorporation of a compound comprising an aminosilane, a mercaptosilane, or a mixture of these, into the rubber composition prior to curing, improves metal adhesion and metal adhesion retention properties between a vulcanizable rubber composition and plated or unplated (e.g., bright) steel, and also improves thermal and humidity ageing. (See, for example, U.S. Pat. No. 7,201,944.)

However, other techniques, such as applying a mixture of alkoxy organosiloxanes in an alcoholic solution to metal plated wire cords, followed by heat setting of the film, is problematic in that the adhesive solution has a limited lifetime with respect to moisture curing. The film itself is insoluble in water and environmental problems are caused by the evolution of the alcohol solvent as a volatile organic compound (VOC).

Therefore, there is still a need to provide a method of treating wire to give a coating that will promote adhesion of a rubber stock to the wire during cure. There is also a need to provide such an adhesive coating to wire that is either unplated or metal plated. Further, there is also a need to provide an adhesion promoter that can be used with all types of rubber and does not require the use of special adhesive additives to the rubber vulcanizates, such as, but not limited to, cobalt, resins and high sulfur levels. In particular, there is a need to improve the adherence performance of the reinforcements to obtain sufficient bonding that is resistant to degradation over the course of time, especially resistance to thermal aging and/or thermo-oxidizing aging, in particular corrosion in the presence of water.

SUMMARY OF THE INVENTION

In our U.S. patent application Ser. No. 11/387,569, filed Mar. 23, 2006, entitled "Compounding Silica-Reinforced Rubber With Low Volatile Organic Compound (VOC) Emission," the entire disclosure of which is hereby incorporated by reference, we described the preparation of alkoxy-modified silsesquioxane (AMS) compounds and co-alkoxy-modified silsesquioxane (co-AMS) compounds that generate less alcohol than conventional alkoxysilane-containing silica-coupling and/or silica dispersing agents used in rubber compounding. The decreased amount of alcohol produced when using the AMS and co-AMS compounds results in vulcanized rubber compounds having one or more improved properties such as, but not limited to, enhanced rubber reinforcement, increased polymer-filler interaction and lower compound viscosity, providing for tires having improved wet and snow traction, lower rolling resistance, increased rebound and decreased hysteresis.

It has now been discovered unexpectedly that amino alkoxy-modified silsesquioxanes (amino AMS), and/or amino co-AMS compounds that also can comprise a mercaptosilane and/or blocked mercaptosilane, are excellent adhesives for coating plated or unplated metal wire for adherence of the wire to a rubber stock.

In a very suitable arrangement, the amino AMS comprises an amino/mercaptan co-AMS. As employed in this description, the term "amino/mercaptan co-AMS" is meant to include the amino/blocked mercaptan co-AMS, unless otherwise designated. The term "amino AMS" is also meant to encompass an amino co-AMS that can comprise other molecules, especially, but not limited to, those having groups that can react with rubber. Such groups include, but are not limited to, acrylates, methacrylates, amino, vinyl, mercapato, sulfur and sulfide groups, and the like.

It has further been discovered that amino AMS and/or amino/mercaptan co-AMS adhesives can be used with all types of rubber and there is no requirement for the use of special adhesive additives to the rubber vulcanizates, such as, but not limited to, cobalt, resins and high sulfur levels. In particular, it was discovered unexpectedly that the use of amino AMS and/or amino co-AMS compounds as adhesives for bonding wire to rubber also improves the adherence performance of the reinforcements to obtain sufficient bonding that is resistant to degradation over the course of time, especially resistance to thermal aging and/or thermo-oxidizing aging, in particular corrosion in the presence of water.

The invention provides a method for preparing an adhesive and/or an adhesive solution containing an amino AMS compound and/or amino co-AMS compound, and the adhesives themselves. The invention further provides a rubber composite comprising steel embedded in a vulcanizable rubber stock and comprising a coating of an adhesive that comprises an amino AMS and/or an amino co-AMS compound. Further provided is a structural component for a pneumatic tire comprising the vulcanized rubber composite and having improved metal adhesion and metal adhesion retention properties, and a pneumatic tire comprising the structural component.

DETAILED DESCRIPTION OF THE INVENTION

The adhesive for coating steel to promote adhesion of rubber to the steel during cure, comprises an amino alkoxy-modified silsesquioxane (AMS) comprising one or more compounds selected from the group consisting of an amino AMS, an amino/mercaptan co-AMS, an amino/blocked mercaptan co-AMS, and a weak acid-neutralized solid or aqueous solution thereof, and mixtures thereof, and having the formula

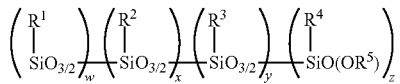

wherein w, x, y and z represent mole fractions, z does not equal zero, at least one of w, x or y must also be present, and $w+x+y+z=1.00$;

wherein at least one of $R^1$, $R^2$, $R^3$ and $R^4$ must be present and selected form the group consisting of $R^6Z$, wherein Z is selected from the group consisting of $NH_2$, $HNR^7$ and $NR^7{}_2$; and the remaining $R^1$, $R^2$, $R^3$ and $R^4$ are the same or different and selected from the group consisting of (i) H or an alkyl groups having one to about 20 carbon atoms, (ii) cycloalkyl groups having 3 to about 20 carbon atoms, (iii) alkylaryl groups having 7 to about 20 carbon atoms, (iv) $R^6X$, wherein X is selected from the group consisting of Cl, Br, SH, $S_aR^7$, $NR^7{}_2$, $OR^7$, $CO_2H$, $SCOR^7$, $CO_3R^7$, OH, olefins, epoxides, amino groups, vinyl groups, acrylates and methacrylates, wherein a=1 to about 8, and (v) $R^6YR^8X$, wherein Y is selected from the group consisting of O, S, NH and $NR^7$; wherein $R^6$ and $R^8$ are selected from the group consisting of alkylene groups having one to about 20 carbon atoms, cycloalkylene groups having 3 to about 20 carbon atoms, and a single bond; and $R^5$ and $R^7$ are selected from the group consisting of alkyl groups having one to about 20 carbon atoms, cycloalkyl groups having 3 to about 20 carbon atoms, and alkylaryl groups having 7 to about 20 carbon atoms.

The mixture of amino alkoxy-modified silsesquioxanes that comprises the adhesive consists essentially of amino alkoxy-modified silsesquioxanes having an open cage structure or ladder-like structure with a reactive alkoxysilyl group and essentially free of closed caged polyhedral organosilsesquioxanes. Without being bound by theory, it is believed that at least one of the $R^1$ silane atoms, $R^2$ silane atoms and $R^3$ silane atoms in every molecule is attached to a silane that has an alkoxy (OR) group. In contrast to the amino AMS structures in the adhesive according to the invention, a closed caged structure such as a polyhedral oligomeric silsesquioxane (POSS) or the like, contains substantially no Si—OR (alkoxysilane) bonds, but only Si—O—Si bonds.

At least one of the $R^1$, $R^2$, $R^3$ and $R^4$ groups of the amino alkoxy-modified silsesquioxane adhesive comprises a group that can bind to an elastomer. Such groups include, but are not limited to, acrylates, methacrylates, amino, vinyl, mercapto, sulfur and sulfide groups, and the like. In one arrangement, the at least one of the $R^1$, $R^2$, $R^3$ and $R^4$ groups of the adhesive amino alkoxy-modified silsesquioxane can be, but is not limited to, a mercaptoalkyl group, a blocked mercaptoalkyl group, and an organo group containing a chain of about 2 to about 8 sulfur atoms, and the like. In a particularly suitable arrangement for use as an adhesive for coating steel wire to promote adhesion of rubber to the steel during cure, the amino AMS comprises an amino/mercaptan co-AMS.

In a suitable arrangement of the adhesive according to the invention, the amino alkoxy-modified silsesquioxane is in an aqueous solution that has been neutralized by a weak acid, and has a pH of about 6.5 to about 4.0, typically about 6.0 to about 5.0. Suitable weak acids can have a $pK_a$ of about 3.5 to about 6.5. For example, the weak acid can comprise, but is not limited to, a weak carboxylic acid such as, but not limited to, acetic acid, ascorbic acid, itaconic acid, lactic acid, malic acid, naphthilic acid, benzoic acid, o-toluic acid, m-toluic acid, p-toluic acid, and the like, and mixtures thereof.

The adhesive can also comprise a solution of the amino AMS that comprises a solvent for the amino AMS such as, but not limited to, water, an alcohol, a hydrocarbon, a chlorocarbon, an ester, an ether, and mixtures of these, and the solution comprises about 0.01% to about 98% of the amino AMS. As a non limiting example, the solvent can independently comprise water, ethanol, hexane, toluene, tetrahydrofuran, 1,4-dioxane, 1,3-dioxolane, acetone, diethyl ether, ethyl acetate, acetonitrile, and mixtures of these.

A method of making the above-described adhesive for coating steel to promote adhesion of rubber to the steel during cure, can comprise the steps of (a) combining as a reaction mixture: (i) water, (ii) a solvent for the water, (iii) a hydrolysis and condensation catalyst, (iv) an optional weak acid, (v) an aminotrialkoxysilane, and (vi) an optional selection from the group consisting of a mercaptoalkyltrialkoxysilane, a blocked mercaptoalkyltrialkoxysilane, and mixtures of these: (b) allowing the reaction mixture to react for about 0.5 hours to about 200 hours to form an amino alkoxysilane-modified silsesquioxane; (c) recovering the amino alkoxysilane-modified silsesquioxane from the reaction mixture; and (d) forming an adhesive solution of the amino AMS in a solvent, wherein the solution comprises about 0.01% to about 98% of the amino AMS.

The solvent for the adhesive amino AMS can include, but is not limited to, water, an alcohol, a hydrocarbon, a chlorocarbon, an ester, an ether, and mixtures of these. For example, suitable solvents can include, but are not limited to water, ethanol, hexane, toluene, tetrahydrofuran, 1,4-dioxane, 1,3-dioxolane, acetone, diethyl ether, ethyl acetate, acetonitrile, and mixtures of these. Suitable, the adhesive solution can comprise about 0.01% to about 98% of the amino AMS, about 0.02% to about 50%, about 0.02% to about 20%, about 0.5% to about 5%, about 0.1% to about 2%, or about 0.2% to about 1% of the amino AMS.

Examples of methods for making suitable amino AMS and amino/mercaptan co-AMS compounds for use as adhesive solutions are described in our U.S. Provisional Patent Applications Ser. Nos. 61/017,932 and 61/018,213, filed Dec. 31, 2007, and in the examples below. However, these examples are not intended to be limiting. From the teachings of this disclosure, other methods for making the compound(s) will become apparent to those skilled in the art.

Briefly, in a general but non-limiting example, the adhesives according to the invention can be made from an amino AMS that has been made by subjecting an aminotrialkoxysilane to hydrolysis and condensation in an aqueous alcohol solution in the presence of a hydrolysis and condensation catalyst. The reaction in continued for a period of time sufficient for substantial total conversion of the reactants to the amino AMS or amino co-AMS compounds. The rate of conversion of the reactants to the final product can be controlled by the concentration of the reactants. The greater the concentration of the reactants, the shorter the reaction time. The temperature at which the reaction takes place is not critical except that it be less than the boiling point of the solvent, although the use of a pressure vessel for the reaction will allow higher temperatures to be used. For example, almost identical yields of amino AMS product can be obtained from ambient temperature (about 25° C.) to about 60° C. to about 100° C. The amino AMS product is then removed from the reaction mixture by distillation of solvent after first neutralizing the amine and the catalyst. Solvent replacement with water will give a stable aqueous concentrated solution.

The period of time for total conversion of the reactants to the amino AMS product depends on the original concentration of the reactants and the optional addition of reactants and/or applied heat during the process. However, if no additional reactants are used, the time can range from about 0.5 hours to about 200 hours, often about 0.75 hours to about 120 hours, or about one hour to about 72 hours.

The hydrolysis and condensation catalyst can be a strong acid, a strong base, a strong organic acid, a strong organic base, a solid strong cationic resin, and mixtures of these. Suitable hydrolysis and condensation catalysts for use in making the amino AMS compounds for use as adhesives are known and include, but are not limited to, strong acids such as hydrocholoric acid, sulfuric acid, phosphoric acid, toluenesulfonic acid, and the like; strong bases such as sodium hydroxide, potassium hydroxide, lithium hydroxide and the like; and strong organic acids and bases, such as DBU (1,8-diazabicyclo[5,4.0] undec-7-ene), DBN (1,5-diazabicylco-[4,3.0] non-5-ene), imidazoles, guanidines and the like; and mixtures of these. The hydrolysis and condensation catalyst is also suitably a solid strong cationic resin such as, but not limited to, those particularly described in methods for making amino AMS compounds using such resins as disclosed in our U.S. Provisional Patent Application Ser. No. 61/017,932 filed Dec. 31, 2007.

When a strong acid, a strong organic acid or a solid strong cationic resin are used as the hydrolysis and condensation catalyst, it is advantageous to add a weak acid buffer to the reaction mixture. The weak acid buffer in the reaction mixture is used to neutralize the amine functionality during the preparation of the amino AMS so that the strong acid can function as the hydrolysis and condensation catalyst. The weak acid buffer (which is not an AMS catalyst) can also act as a stabilizer so that the amine salt in water will not further condense to give an insoluble gelled structure. The weak acid buffer can comprises a weak acid having a $pK_a$ of about 3.5 to about 6.5. For example, a suitable weak acid buffer can comprise, but are not limited to, weak carboxylic acids such as, but not limited to, acetic acid, ascorbic acid, itaconic acid, lactic acid, malic acid, naphthilic acid, benzoic acid, o-toluic acid, m-toluic acid, p-toluic acid, or mixtures of any of these, and the like. The amount of the weak acid buffer in the reaction mixture can range from about 0.5 to about 2 molar equivalents of acid to the amine.

Further, the use of an aqueous solution of an amino/mercapto functional co-AMS prepared with hydrochloric acid has shown good adhesion for steel cord to rubber, but certain side reactions can be observed that possibly could prevent long term usage. The first side reaction is a slow gel formation when the adhesive is diluted with distilled water to a pH of 6.2 or higher. To overcome this problem, the use of the weak acid buffer, such as an acetate and the like described above, can be used to prevent the increase in pH upon dilution and aging. A second side reaction that is sometimes observed is the formation of a slightly cloudy AMS when a strong base or strong organic base, such as an amine or the like, as described above, is used as the catalyst in place of an acid. The cloudy solution that may be produced can be eliminated by the addition of a small amount of sodium borohydride to the base catalyzed co-AMS product. As a result, a clear aqueous stable solution of the amino/mercapto co-AMS can be formed. However, it is to be understood that the invention is not limited to the use of sodium borohydride, as other suitable reducing agents that can act to cleave S—S single bonds to form SH bonds are known to those skilled in the art and would be suitable in the present method.

In one example illustrated below, the hydrolysis and condensation catalyst comprises a solid strong cationic hydrolysis and condensation catalyst. In this method of making the amino AMS compound, the weak acid buffer is used in the reaction mixture to neutralize the amine functionality during the preparation of the amino AMS adhesive so that the solid strong cationic resin can function as the hydrolysis and condensation catalyst. The weak acid buffer (which is not an AMS catalyst) can also act as a stabilizer so that the amine salt in water will not further condense to give an insoluble gelled structure. In this method, the solid strong cationic catalyst can easily be recovered from the reaction mixture as a precipitate, such as by filtration and the like, providing for its reuse in subsequent reactions. An advantage to the use of this method is that the recovered amino AMS adhesive products are free of, or substantially free of, residual strong acid catalyst. The method can further comprise the step of recovering the solid strong cationic catalyst from the reaction mixture for recycling the catalyst.

Suitable solid strong cationic hydrolysis and condensation catalysts for use in making the amino AMS are commercially available and include, but are not limited to, cationic ion exchange resins that have sulfonic acid groups attached to an insoluble polymeric matrix. For example, these solid resins contain a $H^+$ counter ion that is a strong cation exchanger due to its very low pKa (<1.0). As a non-limiting example, such cationic ion exchange resins can be prepared by sulfonating (by treating with sulfuric acid) a polystyrene that has been crosslinked with about 1 percent to about 8 percent divinylbenzene. Example of suitable commercially available strong cationic exchange resins include, but are not limited to, the $H^+$ ionic form of Amberlite IR-120, Amberlyst A-15, Purolite C-100, and any of the Dowex® 50 WX series resins. Such resins are typically gel beads having particle sizes of about 400 mesh to about 50 mesh. The particle size is not crucial in the methods of the invention. Other types of solid supports for the strong cationic ions have been described, such as, but not limited to, polymer strips, polymer membranes, and the like, and are within the scope of the invention. Suitable, the solid strong cationic catalysts are in a physical form that, after the amino AMS adhesives or amino co-AMS adhesives are extracted, will precipitate (or sink) to the bottom of the reaction chamber for simple separation from the reaction mixture, such as by filtration or the like.

In general, a suitable adhesive comprising an amino co-AMS compound can be manufactured by the co-hydrolysis and co-condensation of an aminotrialkoxysilane with, for example, a mercaptoalkyltrialkoxysilane to introduce a mercaptoalkyl functionality, or with a blocked mercaptoalkyltrialkoxysilane so introduce a blocked mercatptoalkyl functionality. In another arrangement, a blocking agent can be bonded to an amino AMS adhesive containing an SH group subsequent to the condensation reaction, as described in the above-referenced U.S. patent application Ser. No. 11/387,569.

Examples of suitable aminotrialkoxysilane reactants include, but are not limited to, 3-[N-(trimethoxysilyl)-propyl]-ethylenediamine, 3-[N-(triethoxysilyl)-propyl]-ethylene-diamine, 3-aminopropyltriethoxysilane, and the like. Examples of suitable sulfur-containing trialkoxysilanes include, but are not limited to mercaptoalkyltrialkoxysilanes, blocked mercaptoalkyltrialkoxysilanes, 3-mercaptopropyltrialkoxysilane, 3-thioacylpropyltrialkoxy-silane, 3-thiooctanoyl-propyltrialkoxysilane, and the like.

In this description the use of the term "block mercaptoalkyltrialkoxysilane" is defined as a mercaptosilane silica coupling agent that comprises a blocking moiety that blocks the mercapto part of the molecule (i.e. the mercapto hydrogen atom is replaced by another group, hereafter referred to as "blocking group") while not affecting the silica-reactive mercaptosilane moiety. Suitable blocked mercaptosilanes can include, but are not limited to, those described in U.S. Pat. Nos. 6,127,468; 6,204,339; 6,528,673; 6,635,700; 6,649,684; 6,683,135; the disclosures of which are hereby incorporated by reference with respect to the examples described. For purposed of this disclosure, the silica-reactive "mercaptosilane moiety" is defined as the molecular weight equivalent to the molecular weight of 3-mercaptopropyltriethoxysilane. A deblocking agent can be added during or after rubber compounding (e.g., later in the manufacturing process, such as during cure), after the silica-silane reaction has occurred, to allow the sulfur atom of the mercaptosilane to bond rapidly with the rubber. The deblocking agent can be added at any time during the compounding process as a single component during any mixing stage in which deblocking is desired. Examples of deblocking agents are well known to those skilled in the art.

In the adhesive according to the invention, the amino AMS and/or the amino/mercaptan co-AMS may also be combined with any AMS and/or co-AMS, such as those described in our U.S. patent application Ser. No. 11/387,569, filed Mar. 23, 2006.

A feature of each of the amino AMS or amino co-AMS adhesives is that the reactive alkoxysilyl group is present at such a low level that only a small amount of alcohol can be liberated by hydrolysis of the product. That is, the z alkoxysilyl group generates only about 0.05% to about 10% by weight alcohol when the product is treated by substantially total acid hydrolysis. Suitably, the amount of generated alcohol is about 0.5% to 8% by weight and, more suitably, the amount of generated alcohol is about 1% to about 6% by weight.

The amount of residual reactive alkoxysilyl groups in each of the final amino AMS adhesive or amino co-AMS adhesive products can be measured by the amount of alcohol recoverable from the product, according to the method published in Rubber Chemistry & Technology 75, 215 (2001). Briefly, a sample of the product is treated by total acid hydrolysis using a siloxane hydrolysis reagent (0.2 N toluenesulfonic acid/0.24 N water/15% n-butanol/85% toluene). This reagent quantitatively reacts with residual ethoxysilane (EtOSi) or methoxysilane (MeOSi), freeing a substantially total amount of ethanol or methanol that is then measured by a headspace/gas chromatographic technique, and expressed as the percentage by weight in the sample.

The amino AMS and/or amino co-AMS products are particularly useful as adhesives for structural components having improved metal adhesion and metal adhesion retention to cured rubber. The invention includes a rubber composite comprising steel embedded in a vulcanizable rubber stock, wherein the steel comprises a coating of an adhesive that comprises an amino alkoxy-modified silsesquioxane (AMS) selected from the group consisting of an amino-AMS, an amino/mercaptan co-AMS, an amino/blocked mercaptan co-AMS, and mixtures thereof, prepared according to the method described above. Any conventional steel can be employed in practicing the present invention. Non-limiting examples include low, medium, and high-carbon grades of steel. Low carbon steel is particularly suitable. When steel wire cord is used in the rubber composite, the wire cord can include, but is not limited to, unplated steel cord, brass plated steel cord, zinc plated steel cord, bronze plated steel cord, plated steel cord at least a portion of which is bright steel, and combinations of these. The steel wire cord can be embedded in the vulcanizable rubber stock by common methods well known to those of ordinary skill in the art of rubber manufacturing. In particular, it has been discovered that special additives that promote adhesion of the metal to the rubber are not necessary when using the present adhesives. Therefore, the rubber used for the composite can be substantially free of additives, metallic salts and complexes that promote adhesion to the steel and, optionally, is free of resorcinol.

A suitable rubber for a pneumatic tire having metallic reinforcement embedded therein can be a rubber skim stock which is suitable for the preparation of such as tires. However, the invention is not limited to a skim stock. Both synthetic and natural rubber may be employed within the vulcanizable rubber compositions of the present invention. These rubbers, which may also be referred to as elastomers, include, without limitation, natural or synthetic poly(isoprene) with natural polyisoprene being preferred, and elastomeric diene polymers including polybutadiene and copolymers of conjugated diene monomers with at least one monoolefin monomer. Suitable polybutadiene rubber is elastomeric and has a 1,2-vinyl content of about 1 to 3 percent and a cis-1,4 content of about 96 to 98 percent. Other butadiene rubbers, having up to about 12 percent 1,2-content, may also be suitable with appropriate adjustments in the level of other components, and thus, substantially any high vinyl, elastomeric polybutadiene can be employed. The copolymers may be derived from conjugated dienes such as 1,3-butadiene, 2-methyl-1,3-butadiene-(isoprene), 2,3-dimethyl-1,2-butadiene, 1,3-pentadiene, 1,3-hexadiene and the like, as well as mixtures of the foregoing dienes. The preferred conjugated diene is 1,3-butadiene.

Regarding the monoolefinic monomers, there include vinyl aromatic monomers such as styrene, alpha-methyl styrene, vinyl naphthalene, vinyl pyridine and the like as well as mixtures of the foregoing. The copolymers may contain up to 50 percent by weight of the monoolefin based upon total weight of copolymer. The preferred copolymer is a copolymer of a conjugated diene, especially butadiene, and a vinyl aromatic hydrocarbon, especially styrene. Preferably, the rubber compound can comprise up to about 35 percent by weight styrene-butadiene random copolymer, preferably 15 to 25 percent by weight.

The above-described copolymers of conjugated dienes and their method of preparation are well known in the rubber and polymer arts. Many of the polymers and copolymers are commercially available. It is to be understood that practice of the present invention is not to be limited to any particular rubber included hereinabove or excluded.

The rubber polymers used in practice of the present invention can comprise either 100 parts by weight of natural rubber, 100 parts by weight of a synthetic rubber or blends of synthetic rubber or blends of natural and synthetic rubber such as 75 parts by weight of natural rubber and 25 parts by weight of polybutadiene. Polymer type, however is not deemed to be a limitation to the practice of the instant invention.

The vulcanizable composition, including the adhesive-coated wire cords, can then be processed according to ordinary tire manufacturing techniques. Likewise, the tires are ultimately fabricated by using standard rubber curing techniques. For further explanation of rubber compounding and the additives conventionally employed, one can refer to The Compounding and Vulcanization of Rubber, by Stevens in Rubber Technology, Second Editions (1973 Van Nostrand Reibold Company), which is incorporated herein by reference. The reinforced rubber compounds can be cured in a conventional manner with known vulcanizing agents at about 0.1 to 10 phr. For a general disclosure of suitable vulcanizing agents, one can refer to Kirk-Othrner, Encyclopedia of Chemical Technology, 3rd ed., Wiley Interscience, N.Y. 1982, Vol. 20, pp. 365 to 468, particularly Vulcanization Agents and Auxiliary Materials, pp. 490 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Preferably, the rubber compounds are sulfur-vulcanized. Cured or crosslinked polymers will be referred to as vulcanizates for purposes of this disclosure.

The adhesive compositions of the present invention can be utilized to form structural components, including their use in the treadstocks for tires. Pneumatic tires can be made according to the constructions disclosed in U.S. Pat. Nos. 5,866,171; 5,876,527; 5,931,211; and 5,971,046, the disclosures of which are incorporated herein by reference. The adhesive composition can also be used to form other elastomeric tire components such as subtreads, sidewalls, body ply skims, bead fillers sidewalls, apex, chafer, sidewall insert, wirecoat, inner liner, and the like, without limitation.

EXAMPLES

The following examples illustrate methods of preparation of representative amino AMS and amino co-AMS products, including amino AMS and amino co-AMS adhesives for improved metal adhesion, and metal adhesion retention to cured rubber. However, the examples are not intended to be limiting, as other amino AMS and amino co-AMS products and adhesives, alone or in combination, can be prepared according to the described methods. Moreover, the methods are exemplary only and other methods for preparing the products employing other reactants can be determined by those skilled in the art without departing from the scope of the invention herein disclosed and claimed.

Example 1

Preparation of 3-aminopropyl AMS hydrochloride

To a one liter flask was added 300 mL of absolute ethanol, 24.42 g of 3-aminopropyl triethoxysilane (110 mmol), 21.6 mL of 12N hydrochloric acid (259 mmol acid and 900 mmol water) and 16.6 mL of water (920 mmol). The solution immediately became cloudy upon mixing and, after standing 3 days at ambient temperature, gave a viscous semi-crystalline mass. The solvent was decanted, purged with nitrogen to remove the remaining solvent, and vacuum dried to give 16.28 g of a white crystalline hydrochloride salt. The theoretical yield (TY) was 16.13 g. The solid was readily soluble in about 120 mL of distilled water to give 149.69 g of a clear solution, which contained about 10.8% total solids and a density of 1.035 g/mL. This solution had a calculated AMS concentration of 0.761 N in silicone. The pH was about 1.0. Titration with standard sodium hydroxide indicated the solution to be 0.0045 N in free hydrochloric acid.

Example 2

Preparation of co-AMS Containing 3-mercaptopropyl and 3-aminopropyl co-AMS hydrochloride in a 45:55 Ratio The procedure of Example 1 was followed, except that the alkoxysilane components were 23.35 g of 3-aminopropyl triethoxysilane (105.2 mmol) and 16.27 g of 3-mercaptopropyl triethoxysilane (84.6 mmol). A cloudy solution was initially formed that remained unchanged after 18 hours. Heating this solution to 50° C. to 60° C. with a nitrogen purge removed most of the solvent to give a white waxy solid which did not change upon vacuum drying. The addition of about 100 mL of water gave a slightly cloudy solution and a small amount (0.56 g) of a solid that was removed. The 130.72 g of solution did not further change upon standing. This solution had a density of 1.061 g/mL and a calculated concentration of 1.44 N of co-AMS. This represented 19.4% total solids. Titration showed the presence of free hydrochloric acid to give a 0.800 N solution.

Example 3

Preparation of co-AMS Containing 3-octanoylthio-1-propyl and 3-aminopropyl co-AMS hydrochloride in a Ratio of 31:69

The procedure of Example 1 was followed, except that the alkoxysilane components were 28.6 g of 3-aminopropyl triethoxysilane (129.2 mmol) and 21.44 g of 3-octanoylthio-1-propyltriethoxysilane (NXT™) (58.8 mmol). A cloudy solution was initially formed and remained unchanged after 18 hours. Heating this solution to 50° C. to 60° C. with a nitrogen purge removed most of the solvent to give a white waxy solid which, upon vacuum drying, gave 33.68 g of a white crystalline powder. The addition of about 200 mL of water was needed to give a mixture that could be stirred. A slightly cloudy fluid solution was obtained after overnight stirring. The 285.9 g of solution did not further change upon standing, had a density of 1.029 g/mL and a calculated concentration of 0.47 N of co-AMS. this represented 8.19% total solids based on the theoretical yield of product. Titration showed the presence of free hydrochloric acid to give a 0.022 N solution.

Example 4

Application of AMS and co-AMS Compounds for Wire Adhesion to Rubber

A dip method was used to coat commercial brass-plated or zinc-plated steel wire cord with the AMS and co-AMS solutions prepared in Examples 1 and 2. A few 7-wire, 360 mm long wire cords at a time were placed in 10 mm diameter by 380 mm tall test tubes partially filled with the respective AMS or co-AMS solutions. A soaking time of 5 minutes was targeted; however, with the amount of free hydrochloric acid present in the solutions described in Examples 1-3, the soaking time was reduced to less than 30 seconds because of the attack of the acid on the wire as evident by foaming and evolution of hydrogen. After this soaking, all wires cords were removed, excess solution was wiped off with a clean cloth, and the wires cords were placed in a clean aluminum tray. The trays containing the coated wire cords were then dried in a 100° C. forced air oven for 20 minutes to remove any remaining moisture prior to test pad preparations.

The steel cord skim compounds used in the test pad preparations was a test belt skim compound containing high sulfur, resin and cobalt, illustrated in Table 1.

TABLE 1

Test skim stock formulation

| Material | Parts per hundred parts rubber (phr) |
|---|---|
| Natural Rubber | 100 |
| Carbon Black | 55 |
| Silica | 8 |
| Zinc Oxide | 6 |
| Phenolic Resin* | 1.9 |
| Cobalt Salt** | 0.85 |
| Insoluble sulfur (80% sulfur) | 6 |
| 2% HMMM*** | 3.5 |
| Antioxidants | 3.5 |
| Accelerator | 0.8 |
| Total | 188.05 |

*Resorcinol-formaldehyde resin
**Cobalt boro-neodecanoate
***Hexamethoxymethylmelamine It is to be understood that the foregoing skim stock formulation is presented solely to enable the evaluation of the practice of the invention. As such, the present invention is not limited to this specific formulation. Moreover, as explained in fuller detail below, skim stocks that do not contain rubber bonding materials such as, but not limited to, cobalt, high sulfur and resin, are also useful according to the present invention.

The brass plated steel wire cords comprised a coating of 63% copper and 37% zinc. The zinc plated steel wire cords comprised a coating of 100% zinc. As stated above, the particular plated steel cord construction employed for the testing has two strands of wire wrapped by seven strands which is in turn wrapped by a single strand. This configuration or style is commonly referred to as 7/2+1 (7 over 2 plus 1) steel cord style. The style of the brass plated and/or zinc plated steel wire cords is not a limitation to the present invention and, therefore, other styles of brass- or zinc-plated steel cords are applicable.

The skim rubber compound was molded around the AMS-coated or co-AMS-coated brass plated wire cords (samples 3 and 5, respectively), or the AMS-coated or co-AMS-coated zinc plated wire cords (samples 4 and 6, respectively), or with non-treated (i.e., no AMS solution applied) controls of brass or zinc-plated wire cords (samples 1 and 2, respectively) and the test pads were then cured at 149° C. for 40 minutes.

The test utilized T-adhesion pads prepared by a standard method, using a Clicker machine having a cavity dimension of 4.0 mm depth, 39 mm width and 200 mm length. The mold slot width was 1 or 1.5 mm. Test pads were built directly in the mold in which they were prepared. The mold was at room temperature during building of the pads. A piece of pre-cut mylar film 35 mm×191 mm was placed in each cavity of the mold. A steel cord specimen was placed in each of 9 slots of the mold cavity. The specimen was pressed down between coils of the spring that was used to hold the wire in place, and pulled to insure that it lay straight on the bottom of the cavity. A polyethylene film was removed from one side of a pre-cut piece of the rubber skim compound prior to placing the piece of rubber in the cavity. The compound was lightly pressed into the cavity. The remaining plastic film was then removed. A sheet of backing fabric (square woven) cut to approximately 305 mm×305 mm was placed over the pads, and pressed lightly onto the pads. The pads were cured within two hours after building.

To cure the test pads, the top plate was placed on the mold and the assembly centered on the curing press platen. After curing, the mylar film was peeled from each pad and the test pads were allowed to equilibrate at room temperature for at least 24 hours after removing from the mold. It is to be understood that the exemplified method of preparing the T-adhesion pads is not a limiting feature of the invention, as other known methods for preparing such pads can be used, without limitation.

Cord to rubber adhesion (CRA) was evaluated for each of the embedded wire cord samples. The pull-out force was measured by a Model 1130 Instron Universal Tester at a crosshead speed of 25.4 cm/min and 110° C.; the T-adhesion pads were preheated in the 110° C. oven for 20 minutes prior to testing. The force necessary to pull or remove the metallic reinforcement from the vulcanized rubber skim stock is given in kg/cm, followed by the percent of rubber skim stock remaining on the surface of the metallic reinforcement. The amount of rubber skim stock remaining on the metallic reinforcement was determined by visual examination and is reported as % rubber coverage. In particular, the coverage of rubber remaining on each of three (3) wire cords after pull out was visually ranked according to the following coverage rankings:

| Coverage Ranking | |
|---|---|
| 100% | A |
| 75% to 100% | B |
| 50% to 75% | C |
| 25% to 50% | D |
| 0% to 25% | E |

The results of the testing are illustrated in Table 2. The cord to rubber adhesion (CRA) test results and observations show that the pull out force required for the AMS-treated or co-AMS-treated brass plated wire cords (samples 3 and 5) was about 50% to about 30% of that of the non-treated brass-plated wire cord (sample 1). This finding is not surprising since, without being bound by theory, it has been suggested that adhesion of the rubber to brass plated wire cords is in larger part mechanical, as the formation of copper sulfide corrodes the wire to provide a roughened surface and the rubber flows into and penetrates the pits and valleys to form a physical bond with the cords. Again, without being bound by theory, it is possible that coating of the brass-plated wire with the AMS or the co-AMS adhesive could coat the surface with the AMS and inhibit the contact of the rubber to the cords and prevent the formation of the physical bond. Additionally the undiluted AMS solutions from Example 1-2 when dried left a visible thick coating of AMS between the individual wires of the cord that also prevented penetration and coating of the rubber skim stock around the wires during molding. The decrease in adhesion of the rubber to the brass plated wire cords was also reflected in the coverage ranking results, where the untreated brass plated controls showed the most residual rubber coverage on pull out.

In contrast to the untreated brass plated wire cords, untreated zinc plated (control) wire cords do not adhere well to rubber skim stocks because no corrosion pits and valleys are formed on the wire cord surface. As illustrated by the control sample 2, the pull out force required for the untreated zinc plated wire cords approached zero, with 0-25% (coverage ranking E) of rubber remaining adhered to the cord. Unexpectedly, however, the coating of the zinc plated wire cords with the AMS or the co-AMS adhesive solutions (samples 4 and 6, respectively) resulted in an increased pull out force of about 660% compared to the untreated zinc plated wire cords (sample 2).

TABLE 2

| Sample No. | 1 | 2 | 3 | 4 | 5 | 6 |
|---|---|---|---|---|---|---|
| AMS or co-AMS used for treatment | Controls (no treatment) | | 3-aminopropyl AMS hydrochloride (Example 1) | | 3-mercaptopropyl-and 3-aminopropyl co-AMS hydrochloride (Example 2) | |
| Wire cord | Brass Plated | Zinc Plated | Brass Plated | Zinc Plated | Brass Plated | Zinc Plated |
| Pull Out Force (kg/cord) | 6.31 | 0.40 | 2.84 | 2.66 | 1.98 | 2.65 |
| Coverage Ranking | 3A | 3E | 3E | 3E | 3E | 3E |
| Surface | Rough | Bare | Smooth | Smooth | Smooth | Smooth |
| % Adhesion Gain/Loss | 100% | 100% | −55% | +660% | −69% | +660% |

Example 5

Preparation of an Amino/Mercapto co-AMS with DBU as Catalyst

The use of an aqueous solution of an amino/mercapto functional co-AMS prepared with hydrochloric acid has shown good adhesion for steel cord to rubber, but there are side reactions that prevent long term usage. The first side reaction is slow gel formation when diluted with distilled water to a pH of 6.2 or higher. To overcome this problem, an acetate buffer was used to prevent the increase in pH upon dilution and aging. A second side reaction was the formation of a slightly cloudy AMS when an amine was used as the catalyst in place of an acid. The cloudy solution that was produced was eliminated by the addition of a small amount of sodium borohydride to the amine catalyzed co-AMS product. As a result, a clear aqueous stable solution of the amino/mercapto co-AMS was formed. However, it is to be understood that the invention is not limited to the use of sodium borohydride, as other suitable reducing agents that can act to cleave S—S single bonds to form SH bonds are known to those skilled in the art and would be suitable in the present method.

The present example (5) and Example 6 demonstrate the use of an acetate buffer and sodium borohydride.

To a 500 mL Erlenmeyer flask was added 34.21 g (155 mmol) of 3-aminopropyl triethyoxysilane, 12.25 g (62 mmol) of 3-mercaptopropyl trimethoxysilane (28.8 mole %) and 241.65 g (308 mL) of absolute ethanol. To this mixture was then added 3.86 g (25 mmol) of 1,8-diazabicyclo[5,4.0]undec-7-ene (DBU) catalyst dissolved in 30.1 g (1.66 mol) of water. A clear solution was obtained that because slightly cloudy within 30 minutes. No phase separation occurred during the next 24 hours, with only a slight increase in cloudiness. The theoretical yield of product was 24.97 g.

About half of this co-AMS solution (sample A, 152.2 g) was added to 250 mL of a sodium acetate/acetic acid aqueous buffer prepared with 4.51 g sodium acetate and 4.1 g of acetic acid. The pH changed from about 3.0 to 9.0 upon the addition. Adjustment with 2.12 g of acetic acid gave a pH of 5.7. Further acetic acid solution of 0.72 g gave a final pH of 5.0. This solution was heated to about 80° C. to remove the ethanol and reduce the final volume to 209 mL of a 5.9 wt % AMS in water. Similarly, the remaining about half of the co-AMS solution (sample B) was buffered with the same acetate buffer containing an additional 2.58 g of acetic acid to give a pH of 5.8. The cloudiness could not be filtered or reduced with sodium borohydride. Both samples A and B were diluted to as low as 0.75 wt % with distilled water (pH 7.2) without any significant change in pH. The dilute solution did not change in clarity or viscosity on standing.

Example 6

Preparation of an Amino/Mercapto co-AMS with DBU as Catalyst and Added Sodium Borohydride To a 500 mL Erlenmeyer flask was added 32.98 g (149 mmol) of 3-aminopropyl triethoxysilane, 12.73 g (65 mmol) of 3-mercaptopropyl trimethoxysilane (30.2 mole %) and 241.68 g (308 mL) of absolute ethanol. To this mixture was then added 3.79 g (25 mmol) of DBU catalyst dissolved in 32.15 g (1.77 mol) of water and 1.76 g (5.29 mmol) of a solution of 0.20 g of sodium borohydride in 10 g of water. The clear solution was stirred for 66 hours with no cloudiness appearing. The addition of about half this solution (165.9 g) to the sodium acetate/acetic acid buffer described in Example 5, containing 4.47 g of extra acetic acid, gave a clear solution that was concentrated by heating to remove the ethanol, as described in Example 5, to give 21.3 g of a 5.9 wt %, pH 5.9, stable aqueous amino/mercapto co-AMS. The pH decreased during the concentration procedure to a value of 4.8 (sample C). The remainder was similarly treated to give a 6.6 wt % solution with a pH of 5.5 that, when reduced to 183.3 g, had a pH of 5.0 (sample D). Both samples C and D remained clear upon dilution with distilled water and gave no cloudiness or gel.

Example 7

Preparation of a 40.3% Amino/Mercapto co-AMS as an Aqueous Solution

The co-AMS was prepared by adding 5.3 g (23.9 mmol) of 3-[N-(trimethoxy-silyl)-propyl]-ethylenediamine, 3.97 g (20.2 mmol) of 3-mercaptopropyl trimethoxysilane to 38 g of absolute ethanol, 5.74 g (315.7 mmol) of water and 0.40 g (2.60 mmol) of DBU catalyst in a 500 mL Erlenmeyer flask. The clear solution was allowed to stand for 17 hours in ambient conditions before added 59 g of water and 3.92 g (65.7 mmol) of acetic acid. The pH was measured as 6.2. The ethanol was removed by heating at 70° C. to 80° C. with a nitrogen purge for one hour. A total of 50.31 g of solution was obtained. Dilution with 54.56 g of water gave a 5.6% solution of amino/mercapto co-AMS with a pH of 6.2. The theoretical yield was 5.87 g of the co-AMS. This solution was used for adhesion studies by dilution to the indicated concentration with distilled water.

Example 8

Testing of Amino/Mercapto co-AMS as an Adhesive for Rubber to Zinc-Plated Steel Wire Cords with and without Heat and Humidity Aging A dip method (as described in Example 4) was used to coat zinc-plated wire cords with the amino/mercapto co-AMS prepared in Example 7 by placing a few 7-wire 360 mm long cords at a time in a partially filled 10 mm diameter by 380 mm tall test tube. After 5 minutes soaking all wire cords were removed and then air dried in a clean aluminum tray. The trays containing the amino/mercapto co-AMS-coated wire cords were then dried from 100° C. to 160° C. in a forced air oven for 20 minutes to remove any remaining moisture, to allow rearrangement of the co-AMS into lattices and to promote film formation.

The sample listed in Table 3 below were prepared according to the procedure of Example 7, and the volumes of distilled water used (if any) and the volume of the amino/mercapto co-AMS (AM-AMS) are also listed. Test pads were prepared using the production skim rubber compound according to Example 4, using amino/mercapto co-AMS-coated zinc-plated steel wire cords (Samples 7-12), uncoated zinc-coated control wire cords, and uncoated brass-plated control wire cords. The pads were cured at 149° C. for 40 minutes.

Some of the cured test pads were exposed for 14 days to a temperature of 45° C. and 95% relative humidity in order to examine the effects of heat and moisture aging on the adherence of the amino/mercapto co-AMS coated wire cords to the rubber.

The pull-out force and Coverage Ranking for each of three (3) wire cords for each category are listed in the Table 3.

The cord to rubber adhesion (CRA) test results and observations show that the pull out force for the un-aged (as molded) co-AMS coated zinc cords was from about 33 to about 46 times that of the uncoated brass-plated wire cord for all solutions of 2.8% solids and lower. The most impressive pull out force was seen with the amino/mercapto co-AMS coated zinc cords after aging 14 days in 95% relative humidity and 45° C. For these dilutions, the average loss in adhesion was only 25%. In contrast, after the same 95% relative humidity for 14 days at 50° C., the uncoated brass-plated wire cord showed 63% loss of adhesion. Visual inspection of sample 7 (from the 5.6% solution) showed buildup of the adhesive layer between the cords, which prevented penetration of the skim stock during molding.

TABLE 3

| | | | | As molded | | | Aged 14 days @ 45° C. and 95% RH* | | |
| --- | --- | --- | --- | --- | --- | --- | --- | --- | --- |
| Sample No. | AM-AMS % solution | Water Used % | AM-AMS mL | Pull out Force kg/cord | Coverage Rating | % of Brass Control | Pull out Force kg/cord | Coverage Rating | Change on Aging % |
| Brass Control | — | — | 0 | 4.15 | 3A | 100% | 1.55 | 3E | −63% |
| Zinc Control | — | — | 0 | 0.10 | 3E | 2.4% | 0.16 | 3E | 46% |
| 7 | 5.6 | 0 | 0 | 0.77 | 3E | 19% | 0.44 | 3E | −43% |
| 8 | 2.8 | 5 | 5 | 3.34 | 3C | 80% | 2.69 | 2D | −20% |
| 9 | 1.4 | 7.5 | 2.5 | 4.62 | 3B | 111% | 3.62 | 3C | −22% |
| 10 | 0.7 | 8.75 | 1.25 | 3.77 | 3B | 91% | 2.80 | 3B | −26% |
| 11 | 0.35 | 9.325 | 0.625 | 3.38 | 3B | 81% | 2.80 | 3B | −17% |
| 12 | 0.18 | 9.687 | 0.313 | 3.49 | 3B | 84% | 2.60 | 3B | −26% |

*Relative Humidity

Example 9

Preparation of a 40.3% Amino/Mercapto co-AMS as an Aqueous Solution with Organic Carboxylic Acid Neutralization The co-AMS was prepared by adding 5.3 g (23.9 mmol) of 3-[N-(trimethoxy-silyl)-propyl]-ethylenediamine, 3.96 g (20.2 mmol) of 3-mercaptopropyl trimethoxysilane (MPS) to 38 g of absolute ethanol, 5.74 g (315.7 mmol) of water and 0.40 g (2.60 mmol) of DBU in a 500 mL Erlenmeyer flask. Analysis of the amount of liberated methanol in this preparation indicated that almost all of the latent alcohol in the starting siloxanes was liberated in the first 5 to 30 minutes of reaction. The clear solution was allowed to stand for 15 to 24 hours at ambient temperature before adding 59 g of water and an equivalent (65.7 mmol) of an organic carboxylic acid was added to each of 5 different sample (13 through 17), as indicated in Table 4 below. The pH was measured to be less than 6.5. The ethanol and by-product methanol were removed by heating at 70° C. to 80° C. with a nitrogen purge for an hour. A VOC-free solution was obtained which was diluted with water to give a 5.6% solution of amino/mercapto AMS with a pH<6.5. The expected yield was 5.87 g of the amino/mercapto co-AMS was used to calculate the concentration of the solution prepared and for all further dilutions with distilled water to prepare subsequent dipping solutions that are used. These solutions were used for adhesion studies (see Table 5) by dilution to the indicated concentration with distilled water.

Table 4 illustrates the sample number, type and weight of organic carboxylic acid used, as well as the solubility in the reaction mixture and the resulting 5.6% aqueous solution of the amino/mercapto co-AMS.

TABLE 4

| Sample No. | Acid Used | Acid Equivalent grams added | Acid Equivalent acid/amine | Initial pH | Final pH | Total wt of 5.6% solution (grams) | Change with acid addition | 5.6% aqueous solution appearance initial | 5.6% aqueous solution appearance after 1 day |
|---|---|---|---|---|---|---|---|---|---|
| 13 | Acetic | 4.6 | 1.00 | 6.2 | 5.6 | 94.22 | clear | clear | clear |
| 14 | Ascorbic | 13.5 | 1.00 | 5.8 | 5.3 | 85.30 | yellow | brown | clear |
| 15 | Itaconic | 5.25 | 1.05 | 6.3 | 5.5 | 93.58 | cloudy, oily ppte. | soluble | clear |
| 16 | Lactic | 8.2 | 1.01 | 6.4 | 6.4 | 93.93 | clear | clear | clear |
| 17 | Malic | 5.41 | 0.53 | 5.5 | 5.3 | 93.45 | cloudy, oily ppte. | soluble | clear |

Example 10

Testing of Amino/Mercapto AMS as an Adhesive for Rubber to Zinc-Plated Steel Wire Cords A dip method, as described in Example 4, was used to coat zinc-plated wire cords with the amino/mercapto AMS prepared in Example 9 by placing a few (7 wire) 360 mm long cords at a time in a partially filled 10 mm diameter by 380 mm tall test tube. After 5 minutes soaking all wire cords were removed without wiping or blotting and then air dried in a clean aluminum tray. The trays containing the amino/mercapto AMS-coated wire cords were then dried from 100° C. to 160° C. in a forced air oven for 10 to 20 minutes to remove any remaining moisture, to rearrange the co-AMS and to promote film formation.

Test pads were prepared using the test skim rubber compound according to Example 4, the amino/mercapto AMS-coated zinc-plated steel wire cords and uncoated brass-plated control wire cords. The pads were cored at 149° C. for 40 minutes.

Some of the prepared test pads were exposed for 14 days to a temperature of 45° C. and 95% relative humidity in order to examine the effects of heat and moisture aging on the adherence of the amino/mercapto co-AMS (AM-AMS) coated wire cords to the rubber.

Table 5 illustrates the CRA test results for each of five examples (18A,B-22A,B) of amino/mercapto AMS-coated zinc-plated steel wire cords that were embedded in the test pads, in which the amino/mercapto AMS treatment solution was pre-diluted with water to contain 1.4% solids (A) or 0.7% solids (B), respectively. The percentage amount of the mercaptopropyl moiety in the amino/mercapto AMS for each sample is also indicated, as well as the type of organic carboxylic acid used to neutralize the amino/mercapto AMS solution, and the pH of the resulting solution.

The CRA test results and observations indicated that the pull out force for the amino/mercapto AMS-coated zinc-plated wire cords was from about 33 to about 46 times that of the untreated zinc-plated wire cord for all solutions. As expected, the pull out force for the untreated zinc-plated wire cords was only about 6% of that of the untreated brass-plated wire cord control, taken at 100%. The most impressive pull out forces were observed with the amino/mercapto AMS-coated zinc-plated wire cords after aging 14 days in 95% humidity and 50° C. For the illustrated dilutions, the average pull out force increased by 25% and the force required was 56% greater than the aged untreated brass-plated wire cords. In contrast, the same aging conditions were deleterious for the untreated brass-plated cords, resulting in 60% loss of the pull out force compared to the un-aged brass-plated controls.

In all cases, the adhesion (pull out) forces of the aged AM-AMS-treated zinc-plated cords samples compared to the aged untreated zinc-plated control sample were 56% greater. Further, samples of products 19, 20 and 22 showed a significant improvement in the molded adhesion as the aqueous solution of the AM-AMS adhesive was more diluted.

The coverage rankings for the treated samples, whether aged or not aged, bear out the pull out force observed, as described above.

Example 11

Preparation of an Amino/Mercapto co-AMS with Organic Carboxylic Acid Neutralization and a Strong Cationic Resin Catalyst. In Particular, Preparation of a co-AMS with 30 mol % of a Mercaptopropyl Silane, and using Dowex 50WX2-100E Strong Cationic Resin Catalyst A strong cationic resin catalyst was used to prepare a co-AMS containing an aminoalkylene silane, a mercaptopropyl silane and a weak carboxylic acid. The co-AMS product was readily obtained in an alcohol water solution by filtration from the insoluble cationic resin. Dilute solutions in water were used for metal coating and adhesive to rubber when the mercaptoalkylene silane was used as a co-AMS with the aminoalkylene silane. After the reaction, the recovered strong cationic resin catalyst was available for reuse for subsequent synthesis reactions.

To a 250 mL Erlenmeyer flask was added 15.76 g (71.0 mmol) of 3-[N-(trimethoxysilyl)-propyl]-ethylenediamine, 5.97 g (30/4 mmol) of 3-mercaptopropyl trimethoxysilane, 77.95 g (101.9 mL) of absolute ethanol, 8.68 g. (65.1 mmol) of acetic acid (1.07 equivalents/amine) and 11.97 g (664 mmol) of distilled water. To this solution was added 1.75 g of water washed and dried Dowex 50WX2-100E (7.07 mmol of acid) strong cationic polystyrene resin (containing 15.9% water by TGA, crosslinked with 2% divinylbenzene, 100 mesh extracted particles).

After stirring for 24 hours, the solution was still clear and the Dowex resin was separated by filtration through a medium sintered glass filter. The product as the acetate was recovered by evaporation of the solvent by heating and a nitrogen purge to give after drying 24.00 g (102% based on the salt) of a sticky viscous oil. The recovered Dowex resin weighed 1.89 g and contained 22.1% water, for total recovery of the resin. The latent alcohol concentration of the amino/mercapto co-AMS was determined to be about 3%.

A total of 50 mL of an aqueous solution was prepared to be 23.3 wt % of the co-AMS. This solution was clear and stable at an adjusted pH of 6.0. This preparation was used as a concentrate to prepare dilute solutions for casting an adhesive coating onto brass plated steel wire.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

TABLE 5

| Sample No. | % AM-AMS Solution | % MPS in AM-AMS Solution | Acid Used | pH of Solution | As Molded Pull out Force kg/cord | As Molded Coverage Rating | Sample vs. Brass Control % Pull out Force | After Aging 14 days @ 50° C. & 95% Relative Humidity Pull out Force kg/cord | After Aging 14 days @ 50° C. & 95% Relative Humidity Coverage Rating | Aged Sample vs. Original Sample % Pull out Force | Aged Sample vs. Aged Brass Control % Pull out Force |
|---|---|---|---|---|---|---|---|---|---|---|---|
| Brass control | | | | | 4.35 | 3A | 100% | 1.73 | 3E | 40% | 100% |
| Zinc control | | | | | 0.26 | 3E | 6% | 0.6 | 3E | 231% | 35% |
| 18A | 1.4 | 30.2 | Acetic | 6.2 | 3.56 | 2B1C | 82% | 3.55 | 3B | 100% | 205% |
| 18B | 0.7 | 30.2 | | | 3.19 | 3C | 73% | 3.00 | 3C | 94% | 173% |
| 19A | 1.4 | 30.1 | Ascorbic | 5.8 | 1.49 | 3E | 34% | 2.18 | 3E+ | 146% | 126% |
| 19B | 0.7 | 30.1 | | | 3.28 | 3C | 75% | 2.67 | 3C | 81% | 154% |
| 20A | 1.4 | 29.9 | Itaconic | 6.3 | 1.36 | 3E | 31% | 2.07 | 2D1E | 152% | 120% |
| 20B | 0.7 | 29.9 | | | 1.46 | 3E | 34% | 2.33 | 3D | 160% | 135% |
| 21A | 1.4 | 31.2 | Lactic | 6.4 | 3.40 | 3C | 78% | 3.33 | 3C | 98% | 192% |
| 21B | 0.7 | 31.2 | | | 3.00 | 2B1E | 69% | 2.98 | 2B1E | 99% | 172% |
| 22A | 1.4 | 30.0 | Malic | 5.5 | 1.52 | 3E | 35% | 2.35 | 2D1E | 155% | 136% |
| 22B | 0.7 | 30.0 | | | 1.60 | 3E | 37% | 2.56 | 3D | 160% | 148% |
| Average | | | | | | | | | | 125% | 156% |

It is claimed:

1. A method comprising:
coating a metal with an adhesive composition comprising an alkoxy-modified silsesquioxane (AMS) selected from the group consisting of an amino AMS, an amino/mercaptan co-AMS, an amino/blocked mercaptan co-AMS, and a weak acid-neutralized solid or aqueous solution thereof, wherein the AMS liberates about 0.05% to about 10% by weight alcohol based on the weight of the AMS when the product is treated by substantially total acid hydrolysis, thereby forming a coated metal;
embedding the coated metal in a rubber composition; and
vulcanizing the rubber composition.

2. A composition comprising:
a coated metal comprising metal coated with adhesive composition, the coated metal embedded in a vulcanizable rubber composition;
the adhesive composition comprising an alkoxy-modified silsesquioxane (AMS) selected from the group consisting of an amino AMS, an amino/mercaptan co-AMS, an amino/blocked mercaptan co-AMS, and a weak acid-neutralized solid or aqueous solution thereof, wherein the AMS liberates about 0.05% to about 10% by weight alcohol based on the weight of the AMS when the product is treated by substantially total acid hydrolysis.

3. The method of claim 1, wherein the adhesive composition is in a solution and neutralized by a weak acid.

4. The method of claim 1, wherein the rubber composition comprises 0 to 0.9 of adhesion promoting metallic salts.

5. The method of claim 1, wherein the rubber composition is formed into a tire structural component selected from the group consisting of: a body ply, a bead, a sidewall insert, a chafer, a sub-tread, sidewall, and an apex.

6. The method of claim 1, wherein the metal comprises a wire cord selected from the group consisting of an unplated steel cord, a brass plated steel cord, a zinc plated steel cord, a bronze plated steel cord, a plated steel cord at least a portion of which is bright steel, and combinations thereof.

7. The method of claim 1, wherein the vulcanized rubber composition has improved adhesion to the steel after humidity aging compared with a vulcanized rubber composition not containing the AMS.

8. The method of claim 1, wherein the rubber composition is substantially free of additives and complexes that promote adhesion to the steel.

9. The method of claim 1, wherein the metal is exclusive of brass.

10. The method of claim 1, wherein the metal is a coated wire, the coating consisting essentially of zinc and the AMS is coated over the coated wire.

11. The method of claim 1, wherein the rubber composition comprises 8 phr or less of silica filler.

12. The method of claim 1, wherein the amine is $NH_2$.

13. The method of claim 1, wherein the rubber is selected from the group consisting of: natural rubber, synthetic polyisoprene, polybutadiene, copolymers of conjugated diene monomers with at least one monoolefin monomer, poly(styrene-butadiene), and mixtures thereof.

14. The method of claim 1, wherein the metal is coated by dipping the metal in a solution comprising the adhesive composition for 30 seconds to 5 minutes and subsequently drying for over twenty minutes prior to embedding in the rubber composition.

15. The composition of claim 2, wherein the vulcanizable rubber composition with the coated metal embedded therein is a tire structural component selected from the group consisting of: a body ply, a bead, a sidewall insert, a chafer, a sub-tread, sidewall, and an apex.

16. The composition of claim 2, wherein the metal comprises a wire cord selected from the group consisting of an unplated steel cord, a brass plated steel cord, a zinc plated steel cord, a bronze plated steel cord, a plated steel cord at least a portion of which is bright steel, and combinations thereof.

17. The composition of claim 2, wherein the metal is exclusive of brass.

18. The composition of claim 2, wherein the metal is a coated wire, the coating consisting essentially of zinc and the AMS coating is over the zinc coating.

19. The composition of claim 2, wherein the rubber composition comprises 8 phr or less of silica filler.

20. The composition of claim 2, wherein the rubber is selected from the group consisting of: natural rubber, synthetic polyisoprene, polybutadiene, copolymers of conjugated diene monomers with at least one monoolefin monomer, poly(styrene-butadiene), and mixtures thereof.

* * * * *